US008150616B2

(12) United States Patent
Shimizu

(10) Patent No.: US 8,150,616 B2
(45) Date of Patent: Apr. 3, 2012

(54) NAVIGATION APPARATUS AND PROGRAM STORAGE MEDIUM

(75) Inventor: Yasuhiro Shimizu, Tokoname (JP)

(73) Assignee: DENSO CORPORATION, Kariya (JP)

( * ) Notice: Subject to any disclaimer, the term of this patent is extended or adjusted under 35 U.S.C. 154(b) by 732 days.

(21) Appl. No.: 12/232,689

(22) Filed: Sep. 23, 2008

(65) Prior Publication Data

US 2009/0082953 A1 Mar. 26, 2009

(30) Foreign Application Priority Data

Sep. 25, 2007 (JP) ................. 2007-247543

(51) Int. Cl.
*G06F 165/00* (2006.01)
(52) U.S. Cl. ....................... 701/205; 701/210
(58) Field of Classification Search ............... 701/205
See application file for complete search history.

(56) References Cited

U.S. PATENT DOCUMENTS

| 5,906,654 | A * | 5/1999 | Sato ............... 701/210 |
| 6,418,373 | B1 | 7/2002 | Omi et al. |
| 2004/0236498 | A1 * | 11/2004 | Le et al. ............ 701/200 |
| 2007/0005235 | A1 | 1/2007 | Suzuki et al. |
| 2007/0005242 | A1 | 1/2007 | Kato et al. |

FOREIGN PATENT DOCUMENTS

| JP | A-2000-088590 | 3/2000 |
| JP | A-2005-031071 | 2/2005 |
| JP | A-2005-292029 | 10/2005 |
| JP | A-2006-064563 | 3/2006 |
| JP | A-2006-170906 | 6/2006 |
| JP | A-2007-085938 | 4/2007 |

OTHER PUBLICATIONS

Office Action mailed Oct. 6, 2009 in corresponding Japanese patent application No. 2007-247543 (and English translation).

* cited by examiner

*Primary Examiner* — Lena Najarian
(74) *Attorney, Agent, or Firm* — Posz Law Group, PLC

(57) ABSTRACT

A navigation apparatus mounted in a subject vehicle designates an inference destination point based on historical data and calculates a reference route to the inference destination point. If the subject vehicle deviates from the reference route before arriving at the inference destination point, the navigation apparatus records a shift route until the subject vehicle returns to the reference route. When the subject vehicle returns to the reference route, the shift route from a deviation point to a return point is recorded as a difference route.

12 Claims, 4 Drawing Sheets

NAVIGATION APPARATUS AND PROGRAM STORAGE MEDIUM

CROSS REFERENCE TO RELATED APPLICATION

This application is based on and incorporates herein by reference Japanese Patent Application No. 2007-247543 filed on Sep. 25, 2007.

FIELD OF THE INVENTION

The present invention relates to a navigation apparatus and a program storage medium used for the navigation apparatus.

BACKGROUND OF THE INVENTION

Patent document 1 discloses a navigation apparatus, in which when a user deviates from a guidance route and then returns to the guidance route, a shift route from a deviation point to a return point is recorded as a difference route. The navigation apparatus adopts the difference route preferentially as a route from the deviation point to the return point at the subsequent retrievals of guidance routes. The subsequent calculation for a guidance route thus reflects the road which the user decided to pass even though deviating from the guidance route. This allows a route guidance or navigation to meet the user's preference.

In addition, Patent document 2 discloses a technology, which records points a user accesses, and proposes, as a destination candidate, a point extracted from the recorded points.

In the technology in Patent document 1, a guidance route is calculated and acquired only when a user sets a destination point uniquely; namely, if a guidance route is not present, the technology does not function at all.

Patent document 1: JP-2001-124578 A (corresponding to U.S. Pat. No. 6,418,373)
Patent document 2: JP-2007-10570 A (corresponding to USP-2007/0005242)

SUMMARY OF THE INVENTION

It is an object of the present invention to provide a technology to record a difference route deviated from a route in a case a user does not designate a destination point uniquely, and reflect the recorded difference route on a subsequent guidance route calculation.

As an example of the present invention, a navigation apparatus is provided as follows. A guidance route is calculated and a user or a subject vehicle is navigated along the calculated guidance route. Position information resulting from an act of a user taking place before an immediately preceding start-up is read and an inference destination point is designated based on the read position information without receiving a direct and unique designation for a destination point by the user. A reference route to reach the designated inference destination point is calculated. A deviation of a present position from the calculated reference route is detected. A return of the present position to the reference route after the deviation is detected is detected. A shift route from a deviation point where the deviation is detected to a return point where the return is detected is recorded as a difference route. Herein, in calculating a guidance route, the difference route is prioritized over another route, as a part of a guidance route including a segment from the deviation point to the return point.

Herein, a "unique designation" is to result in determining only one position. In addition, a "direct designation" is to be used for calculating an inference destination point at the present time.

Under such a configuration, even if the user does not designate the destination point directly and uniquely, the reference route can be calculated and the difference route from the deviation point to the return point of the reference route can be recorded.

As another example of the present invention, a program storage medium is provided as containing instructions readable and executable by a computer, the instructions for causing the computer to function as all the means of the above navigation apparatus.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
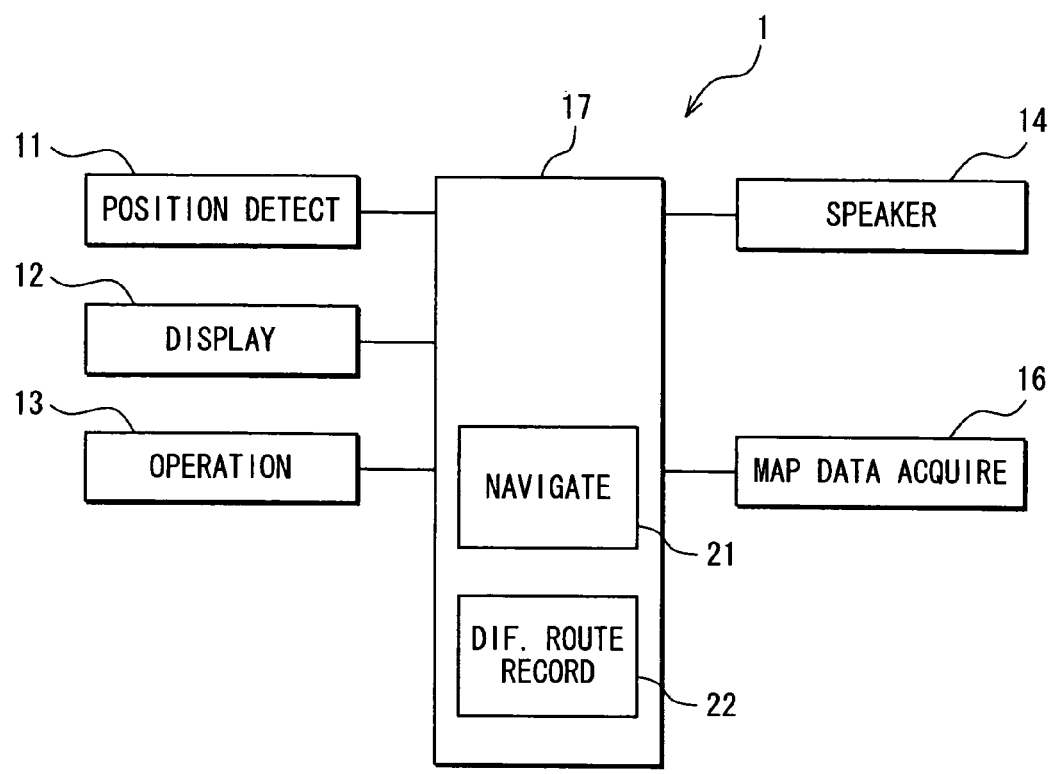
FIG. 1 is a block diagram illustrating a configuration of a vehicular navigation apparatus according to an embodiment of the present invention.

The following describes a first embodiment of the present invention. FIG. 1 illustrates a hardware configuration of a navigation apparatus 1 mounted in a subject vehicle according to the first embodiment. The navigation apparatus 1 includes a position detection device 11, an image display device 12, an operation section 13, a speaker 14, a VICS (Vehicle Information and Communication System) receiver 15, a map data acquisition section 16, and a control circuit 17.

The position detection device 11 includes known sensors or the like such as a geomagnetic sensor, a gyroscope, a speed sensor, and a GPS (Global Positioning System) receiver. The sensors or the like individually output information for designating a present position, a travel direction, or speed of the vehicle to the control circuit 17.

The image display device 12 displays images based on video signals outputted from the control circuit 17. For instance, a display image includes a map in vicinity of a present position.

The operation section 13 includes multiple mechanical switches, a touch panel, etc. which are arranged in the navigation apparatus 1. The operation section 13 outputs signals to the control circuit 17 according to operations of a user.

The map data acquisition section 16 is used for data reading and data writing with a nonvolatile storage medium such as a HDD (Hard Disk Drive). The storage medium stores a program for the control circuit 17 to execute, map data for navigation or route guidance, data of difference routes mentioned later, historical data mentioned later, etc.

The map data includes road data and facility data. The road data includes position and kind information on nodes and links, information on connection relation of nodes and links, etc. The facility data includes, with respect to individual facilities, data on names, locations, land lot numbers (addresses), and facility kinds.

The control circuit 17 is a known microcomputer including a CPU, RAM, ROM, I/O, etc. The CPU executes a program for operations of the navigation apparatus 1 by reading it from the ROM or the map data acquisition section 16. In the execution, the CPU reads information from the RAM, ROM, and the map data acquisition section 16; writes information to the RAM and the storage medium of the map data acquisition section 16, if possible; and communicates data or signals with the position detection device 11, the image display device 12, the operation section 13, and the speaker 14.

Functions realized by the control circuit 17 to execute programs include a route guidance function (or control unit) 21 and a difference route record function (or control unit) 22.

The route guidance function 21 (also referred to as a navigation function) is to calculate a guidance route to a destination and navigate the subject vehicle or user along the guidance route (or perform a guidance to indicate a movement or travel along the guidance route). The difference route record function 22 is to calculate a reference route to an inference destination point mentioned later, and record a difference route from a deviation point to a return point when the subject vehicle deviates from and then returns to the reference route.

In addition, the route guidance function 21 is to reflect the recorded difference route on calculation of guidance routes to destinations. Hereafter, the route guidance function 21 and the difference route record function 22 are explained in further detail.

The route guidance function 21 is realized when the control circuit 17 executes a guidance route calculation process and a route guidance process. In the guidance route calculation process, a direct and unique input of a destination point by a user is accepted via the operation section 13; then an optimal guidance route is calculated from a present position to the inputted destination point by using, for example, the Dijkstra method. Further, in the present embodiment, a present position and travel direction of the navigation apparatus 1 (namely, the subject vehicle) are designated using technology, such as well-known map-matching, based on the signals from the position detection device 11.

Herein, "a unique input" signifies an input which causes the control circuit 17 to limit as a present destination point a specific one among multiple candidates for the destination point. The unique input is exemplified by an input to designate a specific map coordinate (for example, latitude and longitude), an input of a specific land lot number (address), an input of a name proper to a facility, an input of a telephone number of a facility, an input to choose a specific one from multiple destination candidates displayed in a list, etc. In contrast, the unique input precludes an input which cannot determine a destination uniquely by itself such as an input which only chooses a genre of a spot or POI (Point Of Interest).

In addition, a "direct input" signifies an input used for primarily calculating an inference destination point at the present time. For instance, a user may perform a unique input to designate a destination point in retrieval of a guidance route in the past; then, the past input or thus resultant retrieved guidance route may be used for designating an inference destination point at the present time. In such a case, the past unique input is not regarded as a direct input for designating an inference destination point at the preset time.

In addition, in the route guidance process, map data are read from the map data acquisition section 16; the calculated guidance route, destination point, present position, etc. are displayed in superimposition on a map based on the read map data in the image display device 12; audio guidance signals for indicating right-turn, left turn, etc. are outputted to the speaker 14 when needed such as when the subject vehicle approaches an intersection where a guidance is necessary; and the subject vehicle or user can be guided or navigated along the guidance route.

Figure 2:
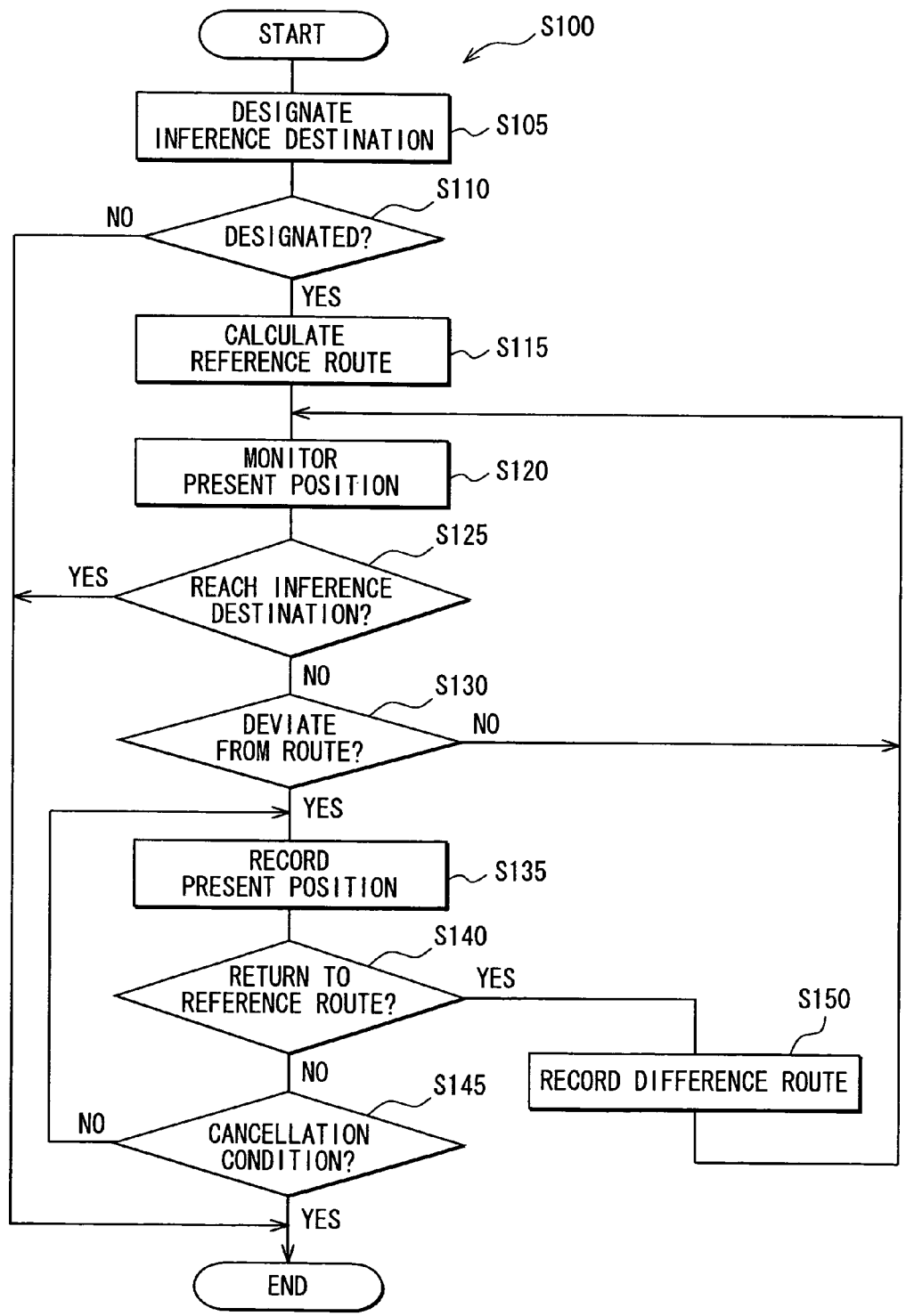
FIG. 2 is a flowchart of a program executed by a control circuit of the navigation apparatus.
Figure 3:
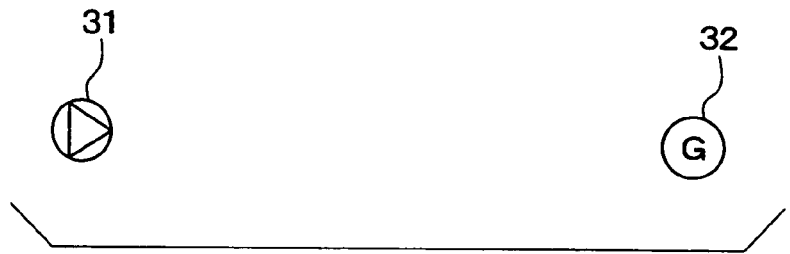
FIG. 3 is a schematic view illustrating a state in which an inference destination point is determined.

The difference route record function 22 is realized by the control circuit 17 to execute a program 100 illustrated in FIG. 2. The control circuit 17 executes the program 100 when the main power supply to the subject vehicle is set to ON or turned ON (i.e., when the ACC or IG switch is turned ON). The control circuit 17 temporarily interrupts an execution till then of the program 100 when the main power supply is turned OFF. The control circuit 17 re-starts and continues the execution of the program 100 from the interrupted point when the main power supply is thereafter turned ON again.

Hereafter, the process of the program 100 is explained with reference to FIGS. 3 to 8. In execution of the program 100, the control circuit 17 intends to designate an inference destination point 32 (refer to FIG. 3) at S105. Designating an inference destination point is based on historical data in the map data acquisition section 16. The historical data stores position information resulting from the past user's act performed before the main power supply is immediately previously turned ON, i.e., before the immediately preceding start-up of the subject vehicle.

For instance, such position information includes the following: a position, where in the past, the subject vehicle stopped and the main power supply to the subject vehicle was turned OFF; a position which the user selected as a destination point in the past; and a shop retrieved in the Internet etc. using a personal computer of the user's home. The position information resulting from the past user's act performed before the main power supply (i.e., before the immediately preceding start-up of the subject vehicle) is immediately previously turned ON can include other than the above examples as long as the other can lead to designation of a position.

In addition, the control circuit 17 stores such information in the map data acquisition section 16 when the relevant user's act such as a stop of the vehicle, a main power supply turning OFF, and a selection of a destination point takes place. Data of a user's act to an apparatus (e.g., a personal computer at home) other than the navigation apparatus 1 may be acquired by the control circuit 17 via a wireless communication network or a wired connection. The control circuit 17 stores or records the acquired data in the map data acquisition section 16.

A specific method for designating an inference destination point is, for instance, as follows. When the historical data include multiple data sets of (i) a position where the subject vehicle stops and the main power supply is turned OFF in the past and (ii) a day of the week and a time point when the subject vehicle stops and the main power supply is turned OFF in the past, a position corresponding to a set of a day of the week and time point closest to the present day of the week and time point may be chosen as an inference destination point. In addition, a method for designating an inference destination point may be a method in Patent document 1.

Then, at S10, it is determined whether designation of an inference destination point is completed. When the designation is completed, the subsequent S115 is performed. When the designation is not completed, the execution of the program 100 is ended.

Figure 4:
FIG. 4 is a schematic view illustrating a state in which a reference route to the inference destination point is determined.

At S115, the control circuit 17 calculates a reference route 33 from the present position 31 to the inference destination point 32 (refer to FIG. 4). The calculation method for the reference route 33 may be the same as or different from that for a guidance route in the route guidance function 21.

Figure 5:
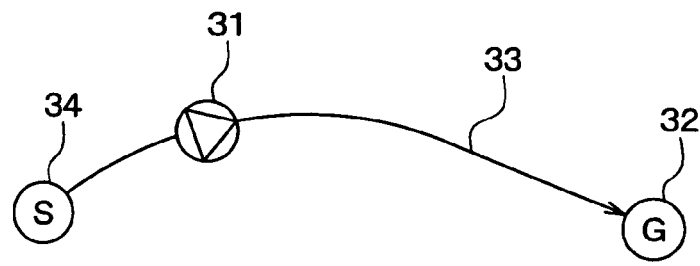
FIG. 5 is a schematic view illustrating a state in which a present position moves along the reference route.
Figure 6:
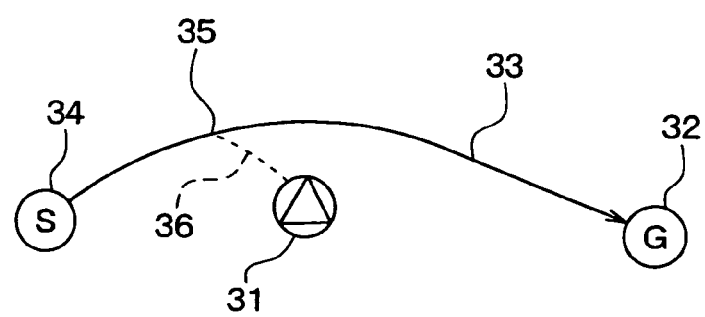
FIG. 6 is a schematic view illustrating a state in which a present position deviates from the reference route from a deviation point.
Figure 7:
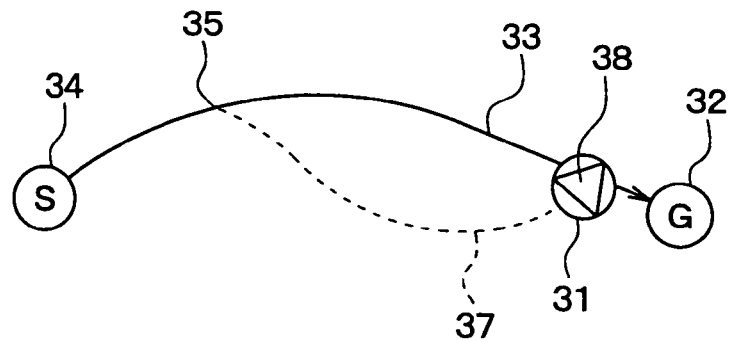
FIG. 7 is a schematic view illustrating a state in which a present position returns into the reference route.

Then, at S120, after the subject vehicle starts a travel from a start point 34, the present position 31 is detected successively (refer to FIG. 5). At S125, it is determined whether the present position 31 reaches the inference destination point 32. If it reaches, the process is ended. If it does not reach, S130 is then performed.

At S130, it is determined whether the present position 31 or the subject vehicle deviates from the reference route 33. For instance, it is determined that the subject vehicle deviates from the reference route 33 when it is determined that the subject vehicle travels on a road not included in the reference route 33 as the result of the map matching. When the vehicle deviates, S130 is performed. When the vehicle does not deviate, S120 is repeated. Thus, the control circuit 17 continues to monitor the present position until the subject vehicle arrives at the inference destination point 32 or deviates from the reference route 33 (refer to FIG. 5).

After the present position 31 deviates from the reference route 33, the present position 31 is detected and recorded at S135. At S145, it is determined whether the present position 31 returns to the reference route 33. When returning to the reference route 33, S150 is performed. When not returning, S145 is performed. Herein, whether the present position 31 returns or not can be determined based on the result of the map matching as to whether the subject vehicle runs a road on the reference route 33.

At S145, it is determined whether a predetermined cancellation condition is satisfied. When the condition is satisfied, the data recorded at S135 till then are cancelled and the execution of the program 100 is ended. When not satisfied, S135 is performed again.

Thus, when the present position 31 deviates from the reference route 33, the control circuit 17 continues recording positions on the shift route 36 from the deviation point 35 to the present position successively (refer to FIG. 6) on the map data acquisition section 16 until the present position 31 returns to the reference route 33 or until the cancellation condition is satisfied. When the present position 31 returns to the reference route 33, the shift route 37 from the deviation point 35 to the return point 38 is recorded (refer to FIG. 7).

At S150 after returning, the control circuit 17 records the shift route 37 from the deviation point 35 to the return point 38 on the map data acquisition section 16 as a difference route. S120 is performed again subsequent to S150.

Next, the cancellation condition is explained. The cancellation condition indicates a less possibility that the subject vehicle arrives at the inference destination point. For instance, the cancellation condition is that the main power supply to the navigation apparatus 1 is not turned ON within a reference time period after being turned OFF under the execution of the program 100.

Herein, the control circuit 17 determines the reference time period by the following equation.

(Reference time period)=(Travel time period)×(Interruption coefficient+Minimum interruption time period)

Here, the travel time period is equivalent to a time period for which the main power supply to the subject vehicle is turned ON by the time when the main power supply is turned OFF. In addition, the cancellation coefficient is a fixed value (for example, 0.3), and the minimum cancellation time period is also a fixed value (for example, 5 minutes).

Figure 8:
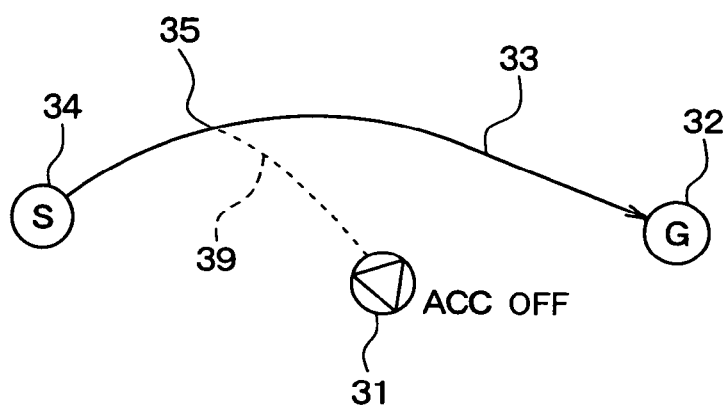
FIG. 8 is a schematic view illustrating a state in which a record of a difference route is canceled at a present position.

When the cancellation condition is satisfied, the control circuit 17 cancels the data of the shift route 39 from the deviation point 35 till then (refer to FIG. 8). The program 100 is then ended without executing S150 thereafter. Therefore, the shift route 39 from the deviation point 35 is not recorded as a difference route.

By executing the above program 100, the control circuit 17 tries to designate an inference destination point based on the historical data (refer to S105). When designated, a reference route to the inference destination point is calculated (refer to S115).

Thereafter, the control circuit 17 performs monitoring the present position repeatedly (refer to S120) until the subject vehicle arrives at the inference destination point (refer to S125) or until the subject vehicle deviates from the reference route (refer to S130).

When the subject vehicle deviates from the reference route before arriving at the inference destination point (refer to S130), the control circuit 17 records and monitors the present position repeatedly (refer to S135) until the subject vehicle returns to the reference route (refer to S140).

When the subject vehicle returns to the reference route (refer to S140), the control circuit 17 records the shift route, which is recorded successively from the deviation point to the return point, as a difference route in the map data acquisition section 16, based on the data of the present position till then (refer to S150).

Herein, when the above cancellation condition is satisfied (refer to S145) without returned to the reference route after the subject vehicle deviated from the reference route (refer to S130), the control circuit 17 cancels the record of the present position after the immediately preceding deviation from the reference route and ends the execution of the program 100. Thus, the record of the difference route from the immediately preceding deviation till then is cancelled.

Herein, the record which is cancelled is only the record of the shift route starting after the immediately preceding deviation. That is, a certain difference route from another deviation point to another return point with respect to the same travel opportunity for the same reference route 33 may have been already recorded at S150. In such a case, even if a cancellation condition is satisfied before the subject vehicle arrives at the inference destination point, the certain difference route remains valid.

The above record of the difference route between a deviation point and a return point is executed whenever a deviation and return takes place in one reference route (refer to the loop of S120 to S150). In addition, the program 100 is repeatedly executed when the main power supply is turned ON. Therefore, regardless of whether a user receives or uses a route guidance or not, the number of recorded difference routes increases as the number of travel opportunities of the subject vehicle increases.

The following explains a method for reflecting recorded difference routes on calculation of guidance routes in the route guidance function 21. The control circuit 17 calculates a guidance route to a destination point designated directly and uniquely by the user, for example using the Dijkstra method in the guidance route calculation process under the route guidance function 21. The control circuit 17 extracts a difference route matching the guidance route among the multiple difference routes recorded in the map data acquisition section 16.

Herein, matching the guidance route and the difference route with each other signifies that the following three conditions are simultaneously satisfied.

Condition 1: Both a start point (namely, deviation point) and an end point (namely, return point) of the difference route are included in the guidance route.

Condition 2: the end point of the difference route is closer to the destination point in the guidance route rather than the start point.

Condition 3: the same difference routes as the relevant difference route are recorded more than a predetermined number of times (e.g., twice) by the difference route record function 22. Herein, the same difference route signifies a difference route having the same start point, the same end point, and the same travel road(s) therebetween.

The control circuit 17 substitutes the extracted difference route for the corresponding segment or portion of the guidance route. Thus, the guidance route after the substitution consequently includes the extracted difference route from the start point up to the end point.

Thus, in calculating a guidance route, the control circuit 17 prioritizes the difference route over another route, as a part of the guidance route with respect to a segment from the deviation point to the return point. Therefore, the guidance route becomes closer to the user's preference.

As explained above, the vehicular navigation apparatus 1 records the difference route from the deviation point to the return point with respect to the reference route, and reflects the recorded difference route on calculation of guidance routes thereafter. In calculation of the reference route, the inference destination point is used which is designated without receiving the direct and unique designation or input of the destination point by the user. The inference destination point is designated based on the historical data about the act of the user taking place prior to the immediately preceding start-up of the navigation apparatus 1 itself. Under such a configuration, even if the user does not designate the destination point directly and uniquely, the reference route can be calculated and the difference route from the deviation point to the return point of the reference route can be recorded.

In addition, as mentioned above, the program 100 is executed automatically after the main power supply to the subject vehicle is turned ON and the navigation apparatus 1 is turned ON accordingly. Even if the user's operation is not received, the inference destination point is designated and the record of the difference route can be executed.

Therefore, without existence or need of the user's intention, the navigation apparatus 1 can designate the inference destination point and subsequently record the difference route. Therefore, from a viewpoint of the user, difference routes are recorded unconsciously. At a certain opportunity when the user tries to be navigated by designating a destination point directly and uniquely, the user recognizes for the first time that choosing the guidance route is improved unknowingly as being preferable to the user.

Thus, if the guidance route can be improved automatically without troubling the user, the convenience for the user can be enhanced.

In contrast, under the conventional technology described in Patent document 1, a guidance route is calculated and acquired only when a user sets a destination point uniquely; namely, if a guidance route is not present, the technology does not function at all. For instance, if a user has not so many opportunities of using route guidance by uniquely designating a destination point, opportunities to record difference routes are significantly decreased. This results in needing a long time period for the guidance route to approach the user's preference.

Furthermore, in the present embodiment, after detecting the deviation, the navigation apparatus 1 cancels or stops recording of the difference route before detecting the return point based on the predetermined cancellation condition being satisfied. Herein, a cancellation condition is designed as being satisfied when a possibility that the subject vehicle arrives at the inference destination point becomes low. Thus, unnecessary recording of the difference route can be decreased.

The cancellation condition is satisfied when the main power supply is not turned ON within a reference time period after being turned OFF. Such an operation is based on the following viewpoint. When the main power supply has been turned OFF for a sufficient time period in the state that the subject vehicle is deviated from the reference route, (i) the position where the power supply is turned OFF may be a practical destination point and (ii) the inference destination point may be thus different from the actual one.

In contrast, turning OFF of the main power supply may result from the rest break of the user's movement or travel. In such a case, the inference destination point may not be wrong, so the record of the difference route may be continued.

Therefore, the reference time period may be designed to be longer as the time period for which the main power supply has been turned ON becomes longer. This is based on the viewpoint that the user's rest break becomes longer as the user's travel time becomes longer.

Further, in the present embodiment, when the vehicle travels the reference route, route guidance is not performed with respect to the reference route. Herein, the route guidance is exemplified by an enlarged display of a map in vicinity of an intersection the reference route passes through, an audio guidance about the right/left turn at the intersection, etc. Therefore, the user need not feel troublesome in the guidance to require the user to follow the reference route which the user does not necessarily desire to follow.

In addition, while the vehicle runs the reference route, the reference route is not displayed in the image display device 12. Therefore, the user can travel or drive the vehicle without being completely conscious about the reference route. As a result, the user can be made to feel the surprise and comfort by the guidance route having become preferable unconsciously with the help of the recorded difference routes.

Second Embodiment

The following describes a second embodiment of the present invention. The present second embodiment is different from the first embodiment in the following point. The control circuit 17 according to the second embodiment designates multiple inference destination points at once, calculates a reference route to each of the inference destination points, and executes recording of the difference route for each reference route.

Figure 9:
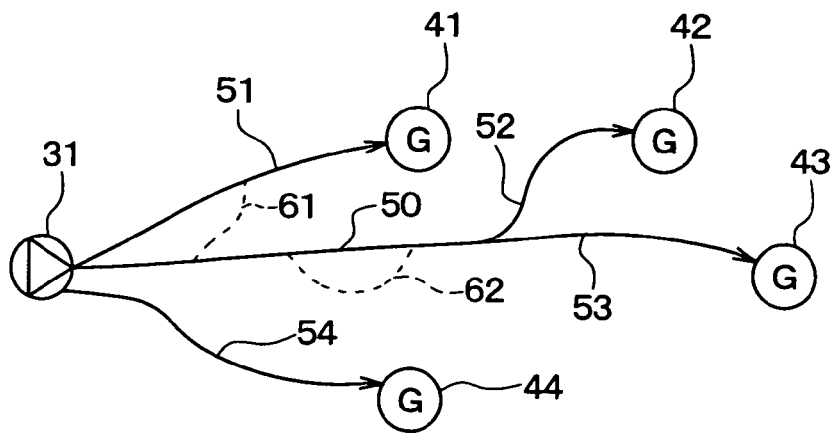
FIG. 9 is a schematic view illustrating multiple reference routes to multiple inference destination points.

To that end, the control circuit 17 of the present embodiment executes in parallel as many processes of the program 100 in FIG. 2 as the designated inference destination points. Thereby, the control circuit 17 of the present embodiment calculates the reference routes to the multiple inference destination points 41, 42, 43, and 44 as illustrated in FIG. 9. In the example of FIG. 9, the reference route corresponding to the inference destination point 41 is a route 51. The reference route corresponding to the inference destination point 42 is a total of routes 50 and 52. The reference route corresponding to the inference destination point 43 is a total of routes 50 and 53. The reference route corresponding to the inference destination point 44 is a route 54.

The inference destination point may contradict the actual destination point as explained in the first embodiment. The subject vehicle having deviated from the reference route may not return to the reference route up to the end of the present travel opportunity. Thus, in such a case, the record of the difference route for the relevant travel opportunity becomes useless.

To that end, in the present embodiment, two or more inference destination points are designated, and the reference route is calculated to each of the inference destination points. The possibility that any one of the multiple inference destination points contradicts the practical destination point is naturally less in comparison with the case that a single inference destination point contradicts. The navigation apparatus 1 according to the second embodiment can try to record the difference routes with respect to the multiple reference routes for the one travel opportunity, so the possibility that such a travel becomes useless can be reduced.

In addition, the control circuit 17 executes the program 100 with respect to each of the reference routes. Thus, detecting of returning to a reference route may be determined only when the subject vehicle deviates from a certain reference route and then returns to the same certain reference route. This is exemplified by the route 62 in FIG. 9.

In contrast, when the following case is not determined to be returning to a reference route. For instance, the subject vehicle deviates from a first reference route and then enters a second reference route. This is exemplified by the route 61 in FIG. 9. Thus, the shift route of the subject vehicle crossing over between different reference routes is not recorded as a difference route.

In addition, each of the reference routes converges on or starts from the present position 31 at the time of calculation of these routes. Therefore, when the present position 31 moves from the start point, the present position 31 deviates from some of the reference routes. In addition, with reference to the routes 52, 53 in FIG. 9, the single reference route 50 may diverge into two reference routes 52, 53; in other words, two reference routes overlap with each other up to a certain branch point and then depart from each other. When the present position 31 passes through the branch point, the present position 31 deviates from at least one of the two reference routes 52, 53.

When the present position 31 advances from the branch point, which includes the start point of the reference routes, along with a certain reference route among the reference routes, the control circuit 17 does not determine that the present position deviates from other reference routes excluding the certain reference route. For example, even if the present position 31 advances along with the route 50 from the start point, the control circuit 17 does not determine that the subject vehicle deviates from the reference route 51 and ends the execution of the program 100 with respect to the reference route 51. In addition, for example, even if the present position 31 advances on the route 52 from the branch point of the two routes 52, 53, the control circuit 17 does not determine that the subject vehicle deviates from the route 53. The control circuit 17 ends the execution of the program 100 with respect to the reference route 53 to the inference destination point 43.

Further, in the above embodiments, the control circuit 17 functions as individual examples of a route guidance means or control unit (further, or a navigation means or control unit) by realizing the route guidance function 21, a destination inference means or control unit by executing S105 of the program 100, a reference route calculation means or control unit by executing S110 of the program 100, a deviation detection means or control unit by executing S130 of the program 100, a return detection means or control unit by executing S140 of the program 100, a record means or control unit by executing S135 and S150 of the program 100, and a record cancellation means or control unit by executing S145 of the program 100.

Other Embodiments

While there have been described specific preferred embodiments of the present invention, it is to be distinctly understood that the present invention is not limited thereto and includes various modes capable of embodying functions of specifics of the present invention.

For instance, the cancellation condition may be differentiated from that in the first embodiment. It may be "After detecting the deviation, the number of times of turning OFF of the main power supply exceeds a predetermined number of times before detecting the return. Such an operation is based on the following viewpoint. When the main power supply has been turned OFF a sufficient number of times in the state that the subject vehicle is deviated from the reference route, (i) the position where the power supply is turned OFF may not be a stopover point, and (ii) the inference destination point may be different from the actual one.

Herein, it is usual that the number of stopover points increases as the distance from the deviation point to the inference point increases. It may be thus designed that the reference number of times increases as the length of the reference route increases.

In addition, if the effect of not making the user completely conscious of the reference route is not needed, the navigation apparatus 1 may display the reference route itself on the image display device 12, while the subject vehicle runs the reference route.

In addition, data needing update such as data of the difference routes and historical data, may be stored not only in the map data acquisition section 16, but also in a storage medium data-retainable even when the main power supply to the navigation apparatus 1 stops such as a flash memory, EEPROM, and backup RAM. In such a case, the storage medium of the map data acquisition section 16 need not be limited to a rewritable storage medium such as a HDD, but may be a not-rewritable storage medium such as a DVD or CD-ROM.

According to the embodiments, the control circuit 17 performs the programs to implement the functions. The functions may be achieved by a hardware device having the equivalent functions. Such hardware device examples include an FPGA capable of programming the circuit construction.

In addition, in the above embodiment, the navigation apparatus 1 is mounted in a vehicle. Instead, the navigation apparatus may be mounted in a marine vessel or airplane; further, the navigation apparatus may be a portable type. For example, a cellular phone having the function of the navigation apparatus may be also included in the navigation apparatus according to the present invention.

For example, when the navigation apparatus of the portable type the user carries is adapted to the above embodiments, turning OFF of the main power supply to the vehicle is replaced by turning OFF of the main power supply to the navigation apparatus; turning ON of the main power supply to the vehicle is replaced by turning ON of the main power supply to the navigation apparatus or start-up of the navigation apparatus.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation apparatus comprising:
a navigation means for calculating a guidance route and navigating along the calculated guidance route;
a destination inference means for reading position information resulting from an act of a user taking place before an immediately preceding start-up and designating an inference destination point based on the read position information without receiving a direct and unique designation for a destination point by the user;
a reference route calculation means for calculating a reference route to reach the designated inference destination point;
a deviation detection means for detecting a deviation of a present position from the calculated reference route;
a return detection means for detecting a return of the present position to the reference route after the deviation is detected;
a record means for recording as a difference route a shift route from a deviation point where the deviation is detected to a return point where the return is detected; and
a record cancellation means for canceling the recording of the shift route after the deviation is detected when a predetermined cancellation condition is satisfied before the return is detected,
wherein in calculating a guidance route, the navigation means is configured to prioritize the difference route over another route, as a part of a guidance route including a segment from the deviation point to the return point, and
wherein the cancellation condition is satisfied when a main power supply is not turned ON within a predetermined time period after being turned OFF.

2. The navigation apparatus according to claim 1, wherein the destination inference means is configured to designate the inference destination point after the start-up without receiving an operation by the user.

3. The navigation apparatus according to claim 1, wherein as a time period from when the main power supply is turned ON to when the main power supply is turned OFF is longer, the predetermined time period is pre-determined to be longer.

4. The navigation apparatus according to claim 1, wherein the destination inference means is configured to designate more than one inference destination point, and the reference route calculation means is configured to calculate reference routes so as to correspond to the more than one inference destination point.

5. The navigation apparatus according to claim 4, wherein when a deviation is detected based on one of the more than one reference route, the return detection means is configured to thereafter detect a return to the one of the more than one reference route.

6. A navigation apparatus comprising:
a navigation means for calculating a guidance route and navigating along the calculated guidance route;
a destination inference means for reading position information resulting from an act of a user taking place before an immediately preceding start-up and designating an inference destination point based on the read position information without receiving a direct and unique designation for a destination point by the user;
a reference route calculation means for calculating a reference route to reach the designated inference destination point;
a deviation detection means for detecting a deviation of a present position from the calculated reference route;
a return detection means for detecting a return of the present position to the reference route after the deviation is detected;
a record means for recording as a difference route a shift route from a deviation point where the deviation is detected to a return point where the return is detected; and
a record cancellation means for canceling the recording of the shift route after the deviation is detected when a predetermined cancellation condition is satisfied before the return is detected,
wherein in calculating a guidance route, the navigation means is configured to prioritize the difference route over another route, as a part of a guidance route including a segment from the deviation point to the return point, and
wherein the cancellation condition is satisfied after the deviation is detected when a predetermined number of times is reached by a number of times of being turned OFF of the main power supply before the return is detected.

7. The navigation apparatus according to claim 6, wherein the destination inference means is configured to designate the inference destination point after the start-up without receiving an operation by the user.

8. The navigation apparatus according to claim 7, wherein as a distance from the deviation point to the return point is longer, the reference number of times is greater.

9. The navigation apparatus according to claim 6, wherein the destination inference means is configured to designate more than one inference destination point, and the reference route calculation means is configured to calculate reference routes so as to correspond to the more than one inference destination point.

10. The navigation apparatus according to claim 9, wherein when a deviation is detected based on one of the more than one reference route, the return detection means is configured to thereafter detect a return to the one of the more than one reference route.

11. A method for calculating a reference route by designating an inference destination point without receiving a destination point from a user in a navigation apparatus, the method comprising:
- reading, in a navigation apparatus, position information resulting from an act of the user taking place before an immediately preceding start-up;
- designating, in the navigation apparatus, an inference destination point based on the read position information without receiving a direct and unique designation for a destination point by the user;
- calculating, in the navigation apparatus, a reference route to reach the designated inference destination point;
- detecting, in the navigation apparatus, a deviation of a present position from the calculated reference route;
- detecting, in the navigation apparatus, a return of the present position to the reference route after the deviation is detected;
- recording as a difference route a shift route from a deviation point where the deviation is detected to a return point where the return is detected; and
- canceling, in the navigation apparatus, the recording of the shift route after the deviation is detected when a predetermined cancellation condition is satisfied before the return is detected, wherein:
in calculating a guidance route, the difference route is prioritized over another route, as a part of a guidance route including a segment from the deviation point to the return point; and
wherein the cancellation condition is satisfied when a main power supply is not turned ON within a predetermined time period after being turned OFF.

12. A method for calculating a reference route by designating an inference destination point without receiving a destination point from a user in a navigation apparatus, the method comprising:
- reading, in the navigation apparatus, position information resulting from an act of the user taking place before an immediately preceding start-up;
- designating, in the navigation apparatus, an inference destination point based on the read position information without receiving a direct and unique designation for a destination point by the user;
- calculating, in the navigation apparatus, a reference route to reach the designated inference destination point;
- detecting, in the navigation apparatus, a deviation of a present position from the calculated reference route;
- detecting, in the navigation apparatus, a return of the present position to the reference route after the deviation is detected;
- recording as a difference route a shift route from a deviation point where the deviation is detected to a return point where the return is detected; and
- canceling, in the navigation apparatus, the recording of the shift route after the deviation is detected when a predetermined cancellation condition is satisfied before the return is detected, wherein:
in calculating a guidance route, the difference route is prioritized over another route, as a part of a guidance route including a segment from the deviation point to the return point; and
the cancellation condition is satisfied after the deviation is detected when a predetermined number of times is reached by a number of times of being turned OFF of the main power supply before the return is detected.

\* \* \* \* \*